(12) United States Patent
Son et al.

(10) Patent No.: US 10,891,032 B2
(45) Date of Patent: Jan. 12, 2021

(54) IMAGE REPRODUCTION APPARATUS AND METHOD FOR SIMULTANEOUSLY DISPLAYING MULTIPLE MOVING-IMAGE THUMBNAILS

(71) Applicant: Samsung Electronics Co., Ltd., Gyeonggi-do (KR)

(72) Inventors: Joo-Young Son, Gyeonggi-do (KR); Tae-Hwa Hong, Seoul (KR)

(73) Assignee: Samsung Electronics Co., Ltd

( * ) Notice: Subject to any disclaimer, the term of this patent is extended or adjusted under 35 U.S.C. 154(b) by 157 days.

(21) Appl. No.: 15/950,705

(22) Filed: Apr. 11, 2018

(65) Prior Publication Data

US 2018/0232128 A1 Aug. 16, 2018

Related U.S. Application Data

(63) Continuation of application No. 13/845,634, filed on Mar. 18, 2013, now abandoned.

(30) Foreign Application Priority Data

Apr. 3, 2012 (KR) .................. 10-2012-0034342

(51) Int. Cl.
*G06F 3/0484* (2013.01)
*G09G 5/14* (2006.01)

(52) U.S. Cl.
CPC .......... *G06F 3/04842* (2013.01); *G09G 5/14* (2013.01); *G09G 2340/0407* (2013.01); *G09G 2340/125* (2013.01)

(58) Field of Classification Search
CPC .................. G06F 3/04842; G09G 5/14; G09G 2340/0407; G09G 2340/125
See application file for complete search history.

(56) References Cited

U.S. PATENT DOCUMENTS 5,081,668 A 1/1992 Ito
5,477,337 A * 12/1995 Schuler ............... G11B 27/028
386/278

(Continued)

FOREIGN PATENT DOCUMENTS

CN 1901632 1/2007
CN 101635814 1/2010

(Continued)

OTHER PUBLICATIONS

European Search Report dated Aug. 24, 2018 issued in counterpart application No. 18185029.8-1210, 19 pages.

(Continued)

*Primary Examiner* — Jung-Mu T Chuang
(74) *Attorney, Agent, or Firm* — The Farrell Law Firm, P.C.

(57) ABSTRACT

An image reproduction method and apparatus are provided for simultaneously displaying multiple moving-image thumbnails. A controller of the image reproduction apparatus generates a moving-image contents list including moving-image thumbnails corresponding to one or more moving-image contents, when a request for displaying the moving-image contents list is input. A multi-image reproducer of the image reproduction apparatus simultaneously reproduces the moving-image thumbnails. The moving-image contents list including the simultaneously reproduced moving-image thumbnails is displayed at a display unit of the image reproduction apparatus.

19 Claims, 8 Drawing Sheets

(56) References Cited

U.S. PATENT DOCUMENTS

| | | | |
|---|---|---|---|
| 5,524,195 A | 6/1996 | Clanton | |
| 5,682,326 A * | 10/1997 | Klingler | G11B 27/034 715/202 |
| 5,884,141 A * | 3/1999 | Inoue | H04N 5/44 725/101 |
| 6,329,787 B1 | 12/2001 | Ito | |
| 6,370,316 B1 * | 4/2002 | Yamada | G11B 27/105 386/230 |
| 6,408,128 B1 * | 6/2002 | Abecassis | H04N 21/440281 386/239 |
| 6,424,357 B1 | 7/2002 | Frulla | |
| 6,469,711 B2 * | 10/2002 | Foreman | G06F 3/0483 375/E7.026 |
| 6,509,716 B2 | 1/2003 | Yi | |
| 6,553,180 B1 | 4/2003 | Kikuchi | |
| 6,788,026 B2 | 9/2004 | Muramatsu | |
| 7,053,917 B2 | 5/2006 | Kato | |
| 7,269,290 B2 | 9/2007 | Tojo | |
| 7,418,673 B2 | 8/2008 | Oh | |
| 7,456,893 B2 | 11/2008 | Son | |
| 7,463,767 B2 * | 12/2008 | Kosako | G11B 27/105 348/E5.104 |
| 7,600,139 B2 | 10/2009 | Ang | |
| 7,693,391 B2 * | 4/2010 | Hamada | G11B 27/105 386/241 |
| 7,702,014 B1 * | 4/2010 | Kellock | G11B 27/28 375/240.08 |
| 7,711,184 B2 * | 5/2010 | Kosako | G11B 27/105 382/162 |
| 7,970,257 B2 | 6/2011 | Momosaki | |
| 7,986,819 B2 | 7/2011 | Momosaki | |
| 7,992,097 B2 * | 8/2011 | Ubillos | G11B 27/034 715/793 |
| 8,004,594 B2 * | 8/2011 | Oyama | H04N 5/23293 348/220.1 |
| 8,078,603 B1 | 12/2011 | Chandratillake et al. | |
| 8,112,711 B2 | 2/2012 | Ackley | |
| 8,179,391 B2 | 5/2012 | Hong | |
| 8,234,280 B1 | 7/2012 | Mayle | |
| 8,331,735 B2 * | 12/2012 | Lee | G06F 16/434 382/305 |
| 8,345,998 B2 | 1/2013 | Malik | |
| 8,462,192 B2 | 6/2013 | O'Connell | |
| 8,538,961 B2 * | 9/2013 | Xu | G06K 9/00664 707/736 |
| 8,571,605 B2 | 10/2013 | Park | |
| 8,572,653 B2 | 10/2013 | Kim | |
| 8,610,821 B2 | 12/2013 | Kawaguchi | |
| 8,621,514 B2 | 12/2013 | Yao | |
| 8,660,403 B2 | 2/2014 | Takahashi | |
| 8,666,182 B2 | 3/2014 | Kim | |
| 8,669,735 B2 | 3/2014 | Kim | |
| 8,671,346 B2 * | 3/2014 | Hua | G06F 16/785 715/723 |
| 8,849,093 B2 * | 9/2014 | Kato | G11B 27/034 386/241 |
| 8,896,776 B2 | 11/2014 | Kimura | |
| 8,942,542 B1 * | 1/2015 | Sherrets | H04N 21/44008 386/262 |
| 9,043,838 B2 | 5/2015 | Yao | |
| 9,047,287 B2 | 6/2015 | Kojima | |
| 9,063,638 B1 * | 6/2015 | Schrock | G06F 3/0484 |
| 9,106,958 B2 | 8/2015 | el Kaliouby et al. | |
| 9,124,111 B2 | 9/2015 | Ogawa | |
| 9,232,136 B2 | 1/2016 | Kawaguchi | |
| 9,237,296 B2 | 1/2016 | Jung | |
| 9,386,328 B1 | 7/2016 | Crane | |
| 9,514,536 B2 | 12/2016 | Rafati | |
| 9,704,281 B2 | 7/2017 | LeBlanc | |
| 10,372,758 B2 * | 8/2019 | Berry | G06F 16/48 |
| 2001/0040592 A1 * | 11/2001 | Foreman | G06F 3/0483 715/723 |
| 2002/0030744 A1 | 3/2002 | Sawachi | |
| 2002/0069218 A1 * | 6/2002 | Sull | G11B 27/28 715/202 |
| 2002/0082059 A1 | 6/2002 | Nariai | |
| 2002/0094026 A1 | 7/2002 | Edelson | |
| 2002/0097984 A1 * | 7/2002 | Abecassis | H04N 21/4722 386/344 |
| 2002/0126135 A1 * | 9/2002 | Ball | G06F 3/14 345/600 |
| 2002/0136301 A1 | 9/2002 | Yoneyama | |
| 2002/0166122 A1 | 11/2002 | Kikinis | |
| 2003/0016947 A1 * | 1/2003 | Ishii | G11B 27/034 386/242 |
| 2003/0026434 A1 | 2/2003 | Naruto | |
| 2003/0076438 A1 | 4/2003 | Ishimaru | |
| 2003/0093790 A1 * | 5/2003 | Logan | G11B 27/34 725/38 |
| 2003/0156824 A1 | 8/2003 | Lu | |
| 2003/0177496 A1 * | 9/2003 | Lee | H04N 21/47815 725/60 |
| 2003/0177503 A1 * | 9/2003 | Sull | G06F 16/71 725/112 |
| 2003/0191756 A1 * | 10/2003 | Oh | G06T 3/0012 |
| 2004/0095396 A1 * | 5/2004 | Stavely | H04N 21/8549 715/838 |
| 2004/0125124 A1 * | 7/2004 | Kim | G06F 16/71 715/716 |
| 2004/0181747 A1 * | 9/2004 | Hull | G06F 3/1204 715/202 |
| 2004/0189692 A1 | 9/2004 | Tojo | |
| 2004/0226048 A1 | 11/2004 | Alpert | |
| 2004/0240005 A1 | 12/2004 | Kim | |
| 2005/0010955 A1 * | 1/2005 | Elia | G06F 3/0482 725/88 |
| 2005/0012829 A1 | 1/2005 | Tashiro | |
| 2005/0063677 A1 * | 3/2005 | Kosako | G11B 27/28 386/230 |
| 2005/0084232 A1 * | 4/2005 | Herberger | G11B 27/031 386/282 |
| 2005/0086692 A1 * | 4/2005 | Dudkiewicz | H04N 5/44543 725/46 |
| 2005/0210414 A1 | 9/2005 | Angiulo | |
| 2006/0017840 A1 | 1/2006 | Sawachi | |
| 2006/0064716 A1 | 3/2006 | Sull et al. | |
| 2006/0174204 A1 | 8/2006 | Jung | |
| 2006/0210157 A1 | 9/2006 | Agnihotri | |
| 2007/0014534 A1 | 1/2007 | Kim | |
| 2007/0046698 A1 | 3/2007 | Nam | |
| 2007/0053657 A1 * | 3/2007 | Hamada | G11B 27/031 386/241 |
| 2007/0064811 A1 | 3/2007 | Zador | |
| 2007/0101268 A1 * | 5/2007 | Hua | G06F 16/7328 715/721 |
| 2007/0103565 A1 * | 5/2007 | Xu | G06K 9/00664 348/231.2 |
| 2007/0201839 A1 | 8/2007 | Murakami | |
| 2007/0226527 A1 | 9/2007 | Ang | |
| 2007/0258703 A1 | 11/2007 | Ohnishi | |
| 2007/0260677 A1 * | 11/2007 | DeMarco | G06F 40/169 709/203 |
| 2007/0294641 A1 * | 12/2007 | Rashkovskiy | H04N 5/44543 715/838 |
| 2008/0018666 A1 | 1/2008 | Takeuchi | |
| 2008/0032739 A1 | 2/2008 | Hoodbhoy | |
| 2008/0065697 A1 | 3/2008 | Moriya | |
| 2008/0152297 A1 * | 6/2008 | Ubillos | G06F 3/04817 386/333 |
| 2008/0155421 A1 * | 6/2008 | Ubillos | G11B 27/031 715/724 |
| 2008/0155459 A1 * | 6/2008 | Ubillos | G11B 27/034 715/783 |
| 2008/0192840 A1 * | 8/2008 | Hua | G11B 27/28 375/240.26 |
| 2008/0193101 A1 * | 8/2008 | Agnihotri | G06F 16/735 386/290 |
| 2008/0311894 A1 * | 12/2008 | Klein | H04L 41/00 455/414.2 |
| 2009/0021592 A1 | 1/2009 | Oyama | |

(56) References Cited

U.S. PATENT DOCUMENTS

| | | | |
|---|---|---|---|
| 2009/0033785 A1 | 2/2009 | Fujinawa | |
| 2009/0076909 A1* | 3/2009 | Ioffe | G06Q 30/02 705/14.61 |
| 2009/0091586 A1* | 4/2009 | Kosako | G11B 27/28 345/670 |
| 2009/0097748 A1* | 4/2009 | Lee | G06F 16/434 382/173 |
| 2009/0100462 A1 | 4/2009 | Park | |
| 2009/0119583 A1* | 5/2009 | Kihara | G06F 16/743 715/273 |
| 2009/0142037 A1 | 6/2009 | Mikawa | |
| 2009/0150947 A1* | 6/2009 | Soderstrom | G11B 27/34 725/93 |
| 2009/0185745 A1 | 7/2009 | Momosaki | |
| 2009/0262074 A1 | 10/2009 | Nasiri | |
| 2009/0313545 A1 | 12/2009 | Kim | |
| 2009/0316017 A1* | 12/2009 | Ichii | H04N 1/00127 348/222.1 |
| 2009/0319231 A1* | 12/2009 | Beland | G09F 9/30 702/183 |
| 2010/0064248 A1* | 3/2010 | Lee | H04N 5/44513 715/781 |
| 2010/0070523 A1 | 3/2010 | Delgo | |
| 2010/0070876 A1 | 3/2010 | Jain | |
| 2010/0088645 A1* | 4/2010 | Zhang | G06F 3/0482 715/838 |
| 2010/0104145 A1 | 4/2010 | Momosaki | |
| 2010/0123816 A1 | 5/2010 | Koh | |
| 2010/0134506 A1 | 6/2010 | Ro et al. | |
| 2010/0153882 A1 | 6/2010 | Nakagawa | |
| 2010/0177955 A1 | 7/2010 | Simakov | |
| 2010/0178024 A1* | 7/2010 | Agarwal | G11B 27/34 386/278 |
| 2010/0239176 A1 | 9/2010 | Yamakado | |
| 2010/0253792 A1 | 10/2010 | Kawaguchi | |
| 2010/0259562 A1 | 10/2010 | Miyazawa | |
| 2010/0262912 A1 | 10/2010 | Cha | |
| 2010/0287070 A1 | 11/2010 | Santeufemia | |
| 2010/0306800 A1 | 12/2010 | Jung | |
| 2010/0332959 A1* | 12/2010 | Mitchell | H04N 21/234336 715/202 |
| 2011/0016395 A1* | 1/2011 | Margulis | G11B 27/34 715/716 |
| 2011/0022982 A1* | 1/2011 | Takaoka | G06F 3/04817 715/810 |
| 2011/0058222 A1 | 3/2011 | Nomoto | |
| 2011/0107220 A1 | 5/2011 | Perlman | |
| 2011/0134257 A1 | 6/2011 | Kojima | |
| 2011/0138420 A1 | 6/2011 | Sanford | |
| 2011/0166824 A1 | 7/2011 | Haisty | |
| 2011/0170029 A1 | 7/2011 | Kimura | |
| 2011/0238754 A1* | 9/2011 | Dasilva | G06Q 30/02 709/204 |
| 2011/0252447 A1 | 10/2011 | Suzuki et al. | |
| 2011/0261293 A1 | 10/2011 | Kimura | |
| 2011/0271304 A1 | 11/2011 | Loretan et al. | |
| 2011/0273540 A1 | 11/2011 | Lee et al. | |
| 2011/0289108 A1* | 11/2011 | Bhandari | H04N 21/234309 707/769 |
| 2011/0321095 A1 | 12/2011 | Yao et al. | |
| 2012/0020643 A1* | 1/2012 | Kato | G11B 27/034 386/241 |
| 2012/0039534 A1 | 2/2012 | Malik | |
| 2012/0054794 A1 | 3/2012 | Kim | |
| 2012/0094720 A1* | 4/2012 | Choi | G06F 16/54 455/566 |
| 2012/0106925 A1 | 5/2012 | Dirik | |
| 2012/0127282 A1 | 5/2012 | Hwangbo | |
| 2012/0128318 A1 | 5/2012 | Yamaguchi | |
| 2012/0139945 A1 | 6/2012 | Choi | |
| 2012/0162249 A1 | 6/2012 | Tsuda | |
| 2012/0216148 A1 | 8/2012 | Takahashi | |
| 2012/0249907 A1 | 10/2012 | Kimura | |
| 2012/0276954 A1 | 11/2012 | Kowalsky | |
| 2012/0294583 A1* | 11/2012 | Kosaka | G06T 13/80 386/230 |
| 2012/0331505 A1* | 12/2012 | Chun | H04N 21/462 725/46 |
| 2013/0019263 A1* | 1/2013 | Ferren | G06F 13/00 725/37 |
| 2013/0024758 A1 | 1/2013 | Darby | |
| 2013/0070143 A1 | 3/2013 | Jang | |
| 2013/0093786 A1* | 4/2013 | Tanabe | H04N 5/76 345/619 |
| 2013/0166587 A1* | 6/2013 | Berry | G06F 16/489 707/769 |
| 2013/0195186 A1* | 8/2013 | Yu | H04N 19/33 375/240.12 |
| 2013/0266066 A1* | 10/2013 | Goel | H04N 19/176 375/240.12 |
| 2013/0279815 A1 | 10/2013 | Xu | |
| 2013/0305190 A1 | 11/2013 | Ahn | |
| 2013/0316763 A1 | 11/2013 | Kader | |
| 2013/0318443 A1* | 11/2013 | Bachman | H04N 5/91 715/723 |
| 2014/0047350 A1* | 2/2014 | Kim | G06F 16/44 715/739 |
| 2014/0098886 A1 | 4/2014 | Crenshaw | |
| 2014/0108585 A1* | 4/2014 | Barton | H04N 21/85403 709/213 |
| 2014/0109140 A1 | 4/2014 | Yao | |
| 2014/0115441 A1* | 4/2014 | Badoiu | G11B 27/105 715/230 |
| 2014/0115534 A1 | 4/2014 | Yuan | |
| 2014/0289629 A1* | 9/2014 | Rossmann | G06F 3/04883 715/722 |
| 2014/0348248 A1 | 11/2014 | Ihara | |
| 2015/0015906 A1* | 1/2015 | Aiba | G06F 1/3284 358/1.13 |
| 2015/0103008 A1* | 4/2015 | Lee | G06F 3/0383 345/165 |
| 2015/0234861 A1 | 8/2015 | Kojima | |
| 2015/0324096 A1 | 11/2015 | LeBlanc | |
| 2016/0098241 A1 | 4/2016 | Lim | |
| 2016/0127764 A1 | 5/2016 | Jung | |
| 2017/0285922 A1 | 10/2017 | LeBlanc | |
| 2019/0303402 A1* | 10/2019 | Berry | G06F 16/7867 |

FOREIGN PATENT DOCUMENTS

| | | |
|---|---|---|
| CN | 101843096 | 9/2010 |
| CN | 102157174 | 8/2011 |
| CN | 102238353 | 11/2011 |
| EP | 1 349 049 | 10/2003 |
| EP | 1 521 468 | 4/2005 |
| EP | 2 034 487 | 3/2009 |
| EP | 2 413 597 | 2/2012 |
| JP | 2004-023787 | 1/2004 |
| KR | 1020060068985 | 6/2006 |
| KR | 1020070028253 | 3/2007 |
| WO | WO 2009/094083 | 7/2009 |

OTHER PUBLICATIONS

Chinese Office Action dated Jul. 24, 2018 issued in counterpart application No. 201310113601.9, 25 pages.
Korean Office Action dated May 23, 2018 issued in counterpart application No. 10-2012-0034342, 9 pages.
Chinese Office Action dated Jan. 31, 2018 issued in counterpart application No. 201310113601.9, 23 pages.
European Search Report dated Nov. 25, 2015 issued in counterpart application No. 15180279.0-1904, 14 pages.
Chinese Office Action dated Jun. 29, 2016 issued in counterpart application No. 201310113601.9, 21 pages.
European Search Report dated Nov. 20, 2017 issued in counterpart application No. 15180279.0-1914, 18 pages.

* cited by examiner

IMAGE REPRODUCTION APPARATUS AND METHOD FOR SIMULTANEOUSLY DISPLAYING MULTIPLE MOVING-IMAGE THUMBNAILS

PRIORITY

This application is a Continuation of U.S. application Ser. No. 13/845,634 filed with the U.S. Patent and Trademark Office on Mar. 18, 2013, and claims priority under 35 U.S.C. § 119(a) to a Korean Patent Application filed in the Korean Intellectual Property Office on Apr. 3, 2012 and assigned Serial No. 10-2012-0034342, the entire disclosure of each of which is incorporated herein by reference.

BACKGROUND OF THE INVENTION

1. Field of the Invention

The present invention relates generally to an image reproduction apparatus and method, and more particularly, to an image reproduction apparatus and method for simultaneously reproducing and displaying respective moving-image thumbnails included in a moving-image thumbnail list for image reproduction when the moving-image thumbnail list is displayed.

2. Description of the Related Art

Generally, if an image reproduction request is input, a terminal capable of reproducing image data generates a list of one or more images stored in a memory of the terminal. The image list is displayed on a screen, and an image selected from the image list is reproduced and displayed on the screen. The terminal receives a list of images stored in an image streaming providing server, which provides an image streaming service, from the image streaming providing server, and displays the received image list on the screen.

When displaying the image list, the terminal displays image reproduction information, such as, for example, a representative thumbnail image presenting a particular scene of a corresponding image, a title of the image, and a reproduction time of the image, together on the image list. The terminal re-sizes a particular frame of the image into a preset image size, sets the re-sized frame to a representative thumbnail image, and displays the representative thumbnail image on the image list.

Thereafter, if a selection for reproducing a particular image of the image list is input, the terminal reproduces and displays the selected image on the screen.

As such, when a conventional terminal displays an image list for image reproduction, image reproduction information, such as, for example, a representative thumbnail image, an image title, and an image reproduction time, is displayed on the image list.

However, as high-resolution video generation and reproduction becomes easier to achieve on a terminal, and as a storage space of the terminal increases, the number and volume of moving-image contents that can be stored in the terminal increase. In addition, with the development of network technologies, the amount of personally created contents also increases.

Since a user may not accurately remember a previously viewed image when desiring to view the image again, it may be difficult for the user to find desired moving-image contents using only a title and a representative thumbnail image of the moving-image contents.

Moreover, the user may need to reproduce one or more moving-image contents several times to find the desired moving-image contents.

SUMMARY OF THE INVENTION

The present invention has been made to address at least the above problems and/or disadvantages and to provide at least the advantages described below. Accordingly, an aspect of the present invention provides an image reproduction apparatus and method for simultaneously reproducing and displaying respective moving-image thumbnails included in a moving-image list to allow a user to easily find and select desired moving-image contents.

According to an aspect of the present invention, an electronic device is provided that includes a memory for storing instructions and a processor configured to execute the instructions to at least store a plurality of video contents in the memory, based on receiving a first user request, display a plurality of video thumbnails for the plurality of video contents on a display of the electronic device, wherein the plurality of video thumbnails are respectively generated from the plurality of video contents, and a video thumbnail includes a plurality of image frames to be sequentially displayed, based on a user input for selecting one of the displayed plurality of video thumbnails, reproduce a video content corresponding to the selected video thumbnail, based on a user input for selecting one of the plurality of video contents, display a plurality of section-based video thumbnails for the selected video content on the display, wherein the plurality of section-based video thumbnails are respectively generated from different portions of the selected video content, and each of the plurality of section-based video thumbnails includes a plurality of image frames to be sequentially displayed, and based on a user input for selecting one of the displayed plurality of section-based video thumbnails, reproduce a portion of the video content corresponding to the selected section-based video thumbnail.

According to another aspect of the present invention, a method is provided for displaying video thumbnails at an electronic device, with the method including, based on receiving a first user request, displaying a plurality of video thumbnails for a plurality of video contents on a display of the electronic device, wherein the plurality of video thumbnails are respectively generated from the plurality of video contents, and a video thumbnail includes a plurality of image frames to be sequentially displayed; based on a user input for selecting one of the displayed plurality of video thumbnails, reproducing a video content corresponding to the selected video thumbnail; based on a user input for selecting one of the plurality of video contents, displaying a plurality of section-based video thumbnails for the selected video content on the display, wherein the plurality of section-based video thumbnails are respectively generated from different portions of the selected video content, and each of the plurality of section-based video thumbnails includes a plurality of image frames to be sequentially displayed; and based on a user input for selecting one of the displayed plurality of section-based video thumbnails, reproducing a portion of the video content corresponding to the selected section-based video thumbnail.

According to a further aspect of the present invention, a non-transitory computer readable storage medium with instructions stored thereon is provided, with the instructions executable by at least one processor of an electronic device to cause the at least one processor to control: based on receiving a first user request, displaying a plurality of video thumbnails for a plurality of video contents on a display of the electronic device, wherein the plurality of video thumbnails are respectively generated from the plurality of video contents, and a video thumbnail includes a plurality of image frames to be sequentially displayed; based on a user input for selecting one of the displayed plurality of video thumbnails, reproducing a video content corresponding to the selected video thumbnail; based on a user input for selecting one of the plurality of video contents, displaying a plurality of section-based video thumbnails for the selected video content on the display, wherein the plurality of section-based video thumbnails are respectively generated from different portions of the selected video content, and each of the plurality of section-based video thumbnails includes a plurality of image frames to be sequentially displayed; and based on a user input for selecting one of the displayed plurality of section-based video thumbnails, reproducing a portion of the video content corresponding to the selected section-based video thumbnail.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
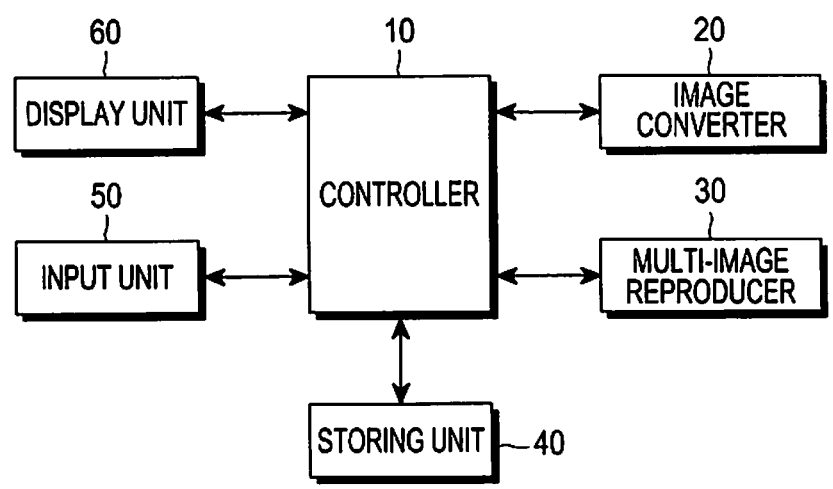
FIG. 1 is a block diagram illustrating an image reproduction apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention determine whether representative video thumbnails for one or more video contents exist in response to an image reproduction request, and simultaneously reproduces and displays the representative video thumbnails corresponding to the one or more video contents if the representative video thumbnails exist, thus allowing a user to easily find desired video contents.

FIG. 1 is a block diagram illustrating an image reproduction apparatus, according to an embodiment of the present invention.

Referring to FIG. 1, the image reproduction apparatus includes a controller 10, an image converter 20, a multi-image reproducer 30, a storing unit 40, an input unit 50, and a display unit 60.

The controller 10 may include a Central Processing Unit (CPU), a Read Only Memory (ROM) having a control program for controlling the image reproduction apparatus, and a Random Access Memory (RAM) used as a memory region for storing a signal or data that is input from outside the image reproduction apparatus or an operation that is performed in the image reproduction apparatus. The CPU may include, for example, a single core, a dual core, a triple core, or a quad core, and the CPU, the ROM, and the RAM may be interconnected through an internal bus.

The controller 10 may control the image converter 20, the multi-image reproducer 30, the storing unit 40, the input unit 50, and the display unit 60.

The controller 10 generates a moving-image contents list including representative moving-image thumbnails corresponding to one or more moving-image contents stored in the storing unit 40, if a request for displaying the moving-image contents list for moving-image contents reproduction is input through the input unit 50. Thereafter, the controller 10 controls the multi-image reproducer 30 to simultaneously reproduce the respective moving-image thumbnails, and the controller 10 displays the moving-image contents list including the reproduced one or more representative moving-image thumbnails through the display unit 60. The controller 10 controls the multi-image reproducer 30 to simultaneously or sequentially reproduce the respective moving-image thumbnails in an automatic manner without a user's selection or execution.

In order to generate one or more representative moving-image thumbnails in advance, the controller 10, according to an embodiment of the present invention, may control the image converter 20 to generate one or more representative moving-image thumbnails by converting one or more moving-image contents when the image reproduction apparatus is charged or is in a sleep mode.

In another embodiment of the present invention, the controller 10 determines whether there are representative moving-image thumbnails corresponding to one or more moving-image contents stored in the storing unit 40. A representative moving-image thumbnail is a moving image generated by converting a moving-image section, corresponding to a preset time point in moving-image contents, to a preset size. The moving-image thumbnail may be a moving image having a size of 320 pixels (width) by 240 pixels (length), and having a rate of 15 frames per second. The preset size is at least ⅕ or 1/10 smaller than a pixel size of original moving-image contents.

If there are representative moving image thumbnails corresponding to one or more moving-image contents, the controller 10 generates a moving-image contents list including the representative moving-image thumbnails corresponding to the one or more moving-image contents. The controller 10 controls the multi-image reproducer 30 to simultaneously reproduce the respective moving-image thumbnails. The controller 10 displays the moving-image contents list, including the reproduced one or more representative moving-image thumbnails, through the display unit 60. The controller 10 may variously configure and display the moving-image contents list, including the one or more representative moving-image thumbnails, according to the screen size of the display unit 60 and the size of the representative moving-image thumbnails. For example, when displaying the moving-image contents list through the display unit 60, the controller 10 may further display image information, such as, for example, title, reproduction time, producer, creator, and description, of the moving-image contents, as well as the representative moving-image thumbnails.

If representative moving-image thumbnails corresponding to the one or more moving-image contents do not exist, the controller 10 controls the image converter 20 to generate representative moving-image thumbnails corresponding to the one or more moving-image contents. The controller 10 generates the moving-image contents list including the generated one or more representative moving-image thumbnails. The controller 10 controls the multi-image reproducer 30 to simultaneously reproduce the one or more representative moving-image thumbnails included in the generated moving-image contents list. The controller 10 displays the moving-image contents list, including the reproduced one or more representative moving-image thumbnails, through the display unit 60. Specifically, the controller 10 controls the multi-image reproducer 30 to simultaneously reproduce the one or more representative moving-image thumbnails, thus, allowing the user to view the representative moving-image thumbnails reproduced on the moving-image contents list and find desired moving-image contents.

Thereafter, if a selection of a representative moving-image thumbnail for reproducing particular moving-image contents is input through the input unit 50, the controller 10 reproduces the moving-image contents corresponding to the selected representative moving-image thumbnail and displays the moving-image contents through the display unit 60. The moving-image contents is a high-definition moving image, and may be moving image data having a size of 1920 pixels (width) by 1080 pixels (length), and having a rate of 30 frames per second.

If a request for displaying one or more section-based moving-image thumbnails corresponding to the moving-image contents is input through the input unit 50, the controller 10 determines whether there are one or more section-based moving-image thumbnails.

If there are one or more section-based moving-image thumbnails, the controller 10 controls the multi-image reproducer 30 to simultaneously reproduce the one or more section-based moving-image thumbnails, and the controller 10 displays the reproduced one or more section-based moving-image thumbnails through the display unit 60.

If the one or more section-based moving-image thumbnails do not exist, the controller 10 divides moving-image contents into one or more moving-image sections, according to a preset condition. The controller 10 controls the image converter 20 to generate a moving-image thumbnail by converting a portion of each moving-image section. The preset condition includes feature information, such as, for example, time, face detection, facial expression detection, voice detection, and scene change. Thus, the controller 10 may divide the moving-image contents into moving-image sections, each of which corresponds to a preset time, or moving-image sections, each beginning with a moving-image frame having a detected face, facial expression, voice, or scene change. For example, the controller 10 may divide the moving-image contents into moving-image sections corresponding to every 5 minutes and convert moving image data corresponding to a preset time, for example, 20 seconds, in each moving-image section to generate one or more moving-image thumbnails.

Thereafter, the controller 10 controls the multi-image reproducer 30 to simultaneously reproduce the one or more section-based moving-image thumbnails, and displays the reproduced one or more section-based moving-image thumbnails through the display unit 60.

If a selection of a particular moving-image thumbnail from the reproduced one or more section-based moving-image thumbnails is input through the input unit 50, the controller 10 reproduces moving-image contents of the moving-image section corresponding to the selected moving-image thumbnail, and displays the reproduced moving-image contents through the display unit 60.

To generate one or more section-based moving-image thumbnails in advance, the controller 10, according to an embodiment of the present invention, may control the image converter 20 to generate the one or more section-based moving-image thumbnails by converting the moving-image contents when the image reproduction apparatus is charged.

The image converter 20 generates moving-image thumbnails having a resolution, a file format, and a compression scheme desired by the user by converting moving-image contents of various resolutions, file formats, and compression schemes supported in the image reproduction apparatus, according to the performance of the image reproduction apparatus or a screen size of the display unit 60.

In particular, under control of the controller 10, the image converter 20 converts moving-image contents into a preset size in advance to generate representative moving-image thumbnails or one or more section-based moving-image thumbnails. The image converter 20 parses the moving-image contents to identify an extension type of the moving-image contents. The image converter 20 performs decoding by using a codec corresponding to the identified extension type, and resizes the decoded moving-image contents to a preset image size. The image converter 20 encodes the resized moving-image contents by using a codec suitable for a preset image size, and multiplexes the encoded moving-image contents to output the moving-image thumbnails. The image converter 20 may include a parser for parsing the extension type of the moving-image contents, a decoder for decoding the moving-image contents by using one or more codecs corresponding to the extension type, a resizer for resizing the size of the decoded moving-image contents, an encoder for encoding the resized moving-image contents by using the codec corresponding to the resized moving-image contents, and a multiplexer for multiplexing the encoded moving-image contents. For example, to convert moving-image contents having a size of 1920 pixels (width) by 1080 pixels (length) and a rate of 30 frames per second into a moving-image thumbnail having a size of 320 pixels (width) by 240 pixels (length) and a rate of 15 frames per second, the image converter 20 determines an extension type, such as, for example, AVI, MP4, WMV, FLV, and MKV, of the moving-image contents. If the moving-image contents have an extension type of AVI, the image converter 20 decodes the moving-image contents by using a codec such as, for example, Moving Picture Experts Group 4 (MPEG4)4, H.264, H.263, DivX3.11, wmv7.8, or vc1, and resizes the decoded moving-image contents from 1080p to Quarter Video Graphics Array (QVGA). Thereafter, the image converter 20 encodes the moving-image contents of QVGA into MPEG4 and multiplexes the encoded moving-image contents to MP4 to output the moving-image thumbnail. When converting the moving-image contents into a preset size, the image converter 20 maintains a preset ratio of width to length according to a resolution. For example, assuming that a ratio of a width to a length is 1.778 for moving-image contents having 1920 pixels (width) by 1080 pixels (length) and a ratio thereof is 1.333 for moving-image contents having 320 pixels (width) by 240 pixels (length), the image converter 20 may generate a moving-image thumbnail having 320 pixels (width) by 240 pixels (length) by converting the moving-image contents in such a way to maintain the width-to-length ratio of 1.333. If the moving-image contents are converted to generate the moving-image thumbnail smaller than 240 pixels (length), the image converter 20 may perform conversion in such a way to adjust the width and the length to maintain the width-to-length ratio of 1.333 and display the remaining space in black. If the moving-image contents are converted to generate the moving-image thumbnail larger than 320 pixels by 240 pixels, the image converter 20 may cut the size of an image frame into the moving-image thumbnail having 320 pixels (width) by 240 pixels (length) to maintain the width-to-length ratio of 1.333.

The multi-image reproducer 30 simultaneously reproduces one or more representative moving-image thumbnails or one or more section-based moving-image thumbnails, under control of the controller 10.

The storing unit 40 may store input/output signals or data to correspond to operations of the image converter 20, the multi-image reproducer 30, the input unit 50, and the display unit 60, under control of the controller 10. The storing unit 40 may store control programs and applications for control of the image reproduction apparatus or the controller 10.

The term "storing unit" includes the storing unit 40, the ROM or RAM included in the controller 10, or a memory card (for example, a Secure Digital (SD) card or a memory stick) mounted in the image reproduction apparatus. The storing unit 40 may include a non-volatile memory, a volatile memory, a Hard Disk Drive (HDD), or a Solid State Drive (SSD).

The input unit 50 may include a key input means including a plurality of keys for key input, a pointing input means for pointing input, such as, for example, a mouse, and a touch input means for touch input. The input unit 50 forwards an input signal received there through to the controller 10.

The display unit 60 may be embodied as a Liquid Crystal Display (LCD), and visually provides menus of a portable terminal, input data, function setting information, and various other information to the user. The display unit 60 outputs a booting screen, a standby screen, a display screen, a call screen, and other application execution screens of the portable terminal. In particular, the display unit 60 displays one or more representative moving-image thumbnails, or one or more section-based moving-image thumbnails reproduced by the multi-image reproducer 30.

As such, embodiments of the present invention simultaneously reproduce and display representative moving-image thumbnails corresponding to one or more moving-image contents in response to an image reproduction request, allowing the user to view the reproduced moving-image thumbnails and easily find desired moving-image contents.

Figure 2:
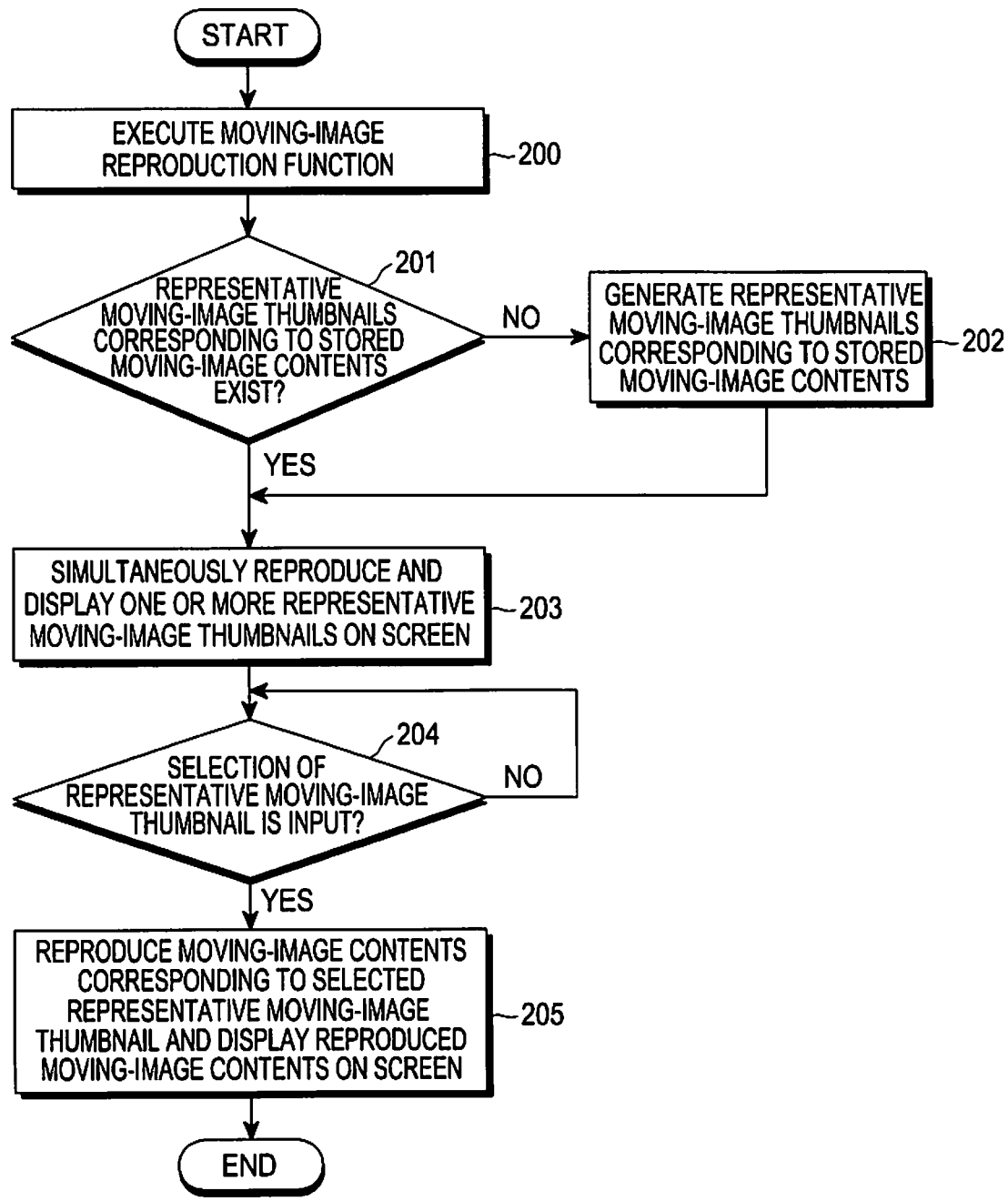
FIG. 2 is a flowchart illustrating a process of reproducing an image by using a moving-image contents list including moving-image thumbnails, according to an embodiment of the present invention.

FIG. 2 is a flowchart illustrating a process of reproducing an image by using a moving-image contents list including moving-image thumbnails, according to an embodiment of the present invention.

In step 200, the controller 10 executes an image reproduction function in response to a request for image reproduction.

In step 201, the controller 10 determines whether there are representative moving-image thumbnails corresponding to one or more moving-image contents stored in the storing unit 40.

If there are representative moving-image thumbnails corresponding to one or more moving-image contents, the controller 10 proceeds to step 203. If there are no representative moving-image thumbnails corresponding to one or more moving-image contents, the controller 10 proceeds to step 202 to control the image converter 20 to generate representative moving-image thumbnails corresponding to the one or more moving-image contents.

In step 203, the controller 10 controls the multi-image reproducer 30 to simultaneously reproduce the representative moving-image thumbnails corresponding to the one or more moving-image contents, and displays the reproduced one or more representative moving-image thumbnails through the display unit 60.

In step 204, the controller 10 determines whether a selection of a representative moving-image thumbnail for reproducing moving-image contents is input. If the selection of a representative moving-image thumbnail is input, the controller 10 proceeds to step 205. If the selection of a representative moving-image thumbnail is not input, the controller 10 continuously repeats step 204 to determine whether the selection of a representative moving-image thumbnail is input.

In step 205, the controller 10 reproduces the moving-image contents corresponding to the selected representative moving-image thumbnail, and displays the reproduced moving-image contents through the display unit 60.

Figure 3:
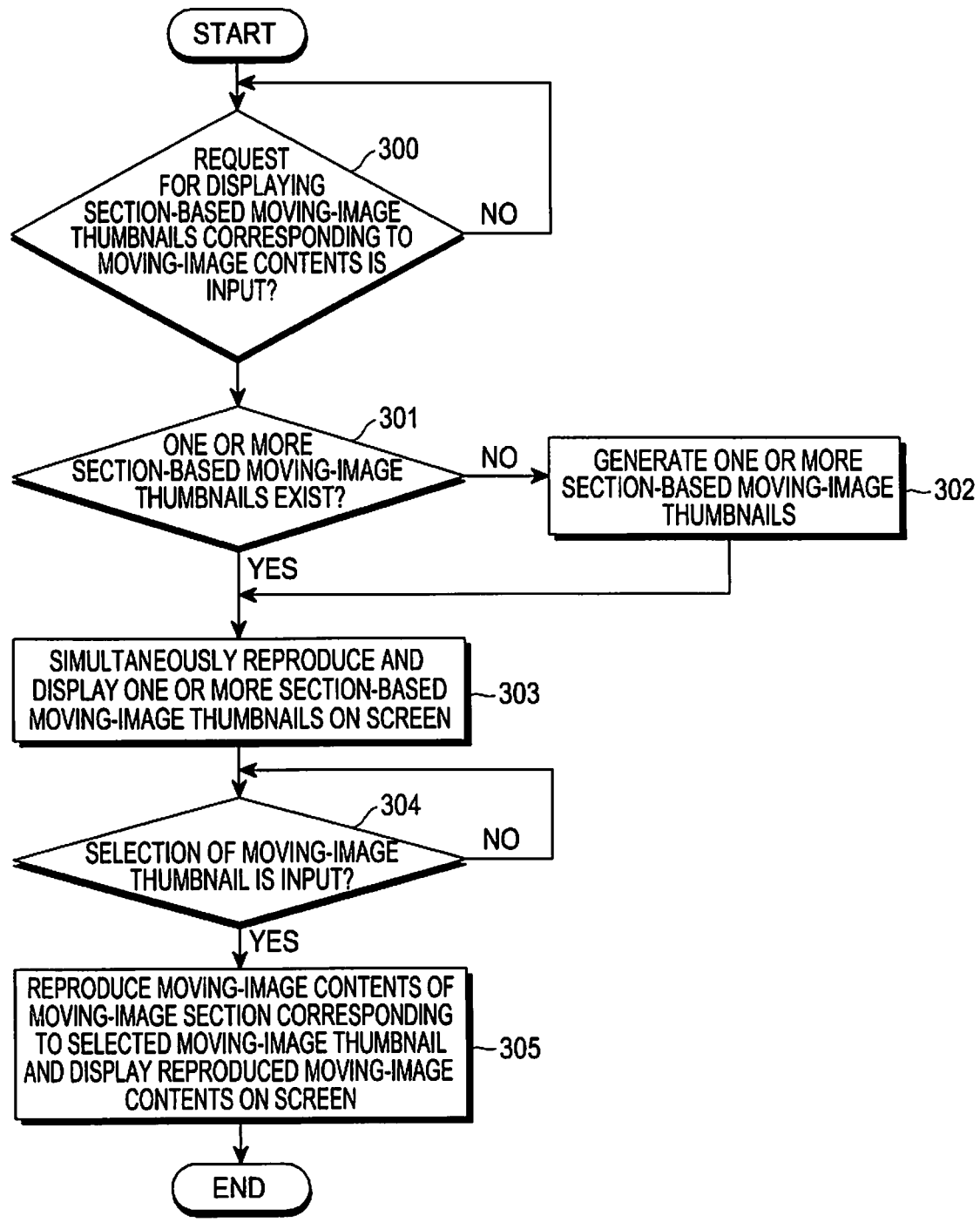
FIG. 3 is a flowchart illustrating a process of reproducing an image by using a section-based moving-image thumbnail list, according to an embodiment of the present invention.

FIG. 3 is a flowchart illustrating a process of reproducing an image by using a section-based moving-image thumbnail list, according to an embodiment of the present invention.

In step 300, the controller 10 determines whether a request for displaying section-based moving-image thumbnails corresponding to the moving-image contents is input. If the request is input, the controller 10 proceeds to step 301. If the request is not input, the controller 10 continuously repeats step 300 to determine whether the request for displaying section-based moving-image thumbnails corresponding to the moving-image contents is input.

In step 301, the controller 10 determines whether there are one or more section-based moving-image thumbnails. If there are one or more section-based moving-image thumbnails, the controller 10 proceeds to step 303. If there are no section-based moving-image thumbnails, the controller 10 proceeds to step 302 to generate one or more section-based moving-image thumbnails. Specifically, the controller 10 divides moving-image contents into one or more moving-image sections according to a preset condition, as previously described, and controls the image converter 20 to generate a moving-image thumbnail by converting a portion of each moving-image section.

In step 303, the controller 10 controls the multi-image reproducer 30 to simultaneously reproduce the one or more section-based moving-image thumbnails and displays the reproduced one or more section-based moving-image thumbnails through the display unit 60.

In step 304, the controller 10 determines whether a selection of a moving-image thumbnail is input. If the selection of a moving-image thumbnail is input, the controller 10 proceeds to step 305. If the selection of a moving-image thumbnail is not input, the controller 10 continuously repeats step 304 to determine whether a selection of a moving-image thumbnail is input.

In step 305, the controller 10 reproduces moving-image contents of a moving-image section corresponding to the selected moving-image thumbnail, and displays the reproduced moving-image contents through the display unit 60.

Embodiments of the present invention simultaneously reproduce and display representative moving-image thumbnails corresponding to one or more moving-image contents in response to an image reproduction request, allowing the user to view the reproduced moving-image thumbnails and easily find desired moving-image contents.

As previously described, the controller 10, according to an embodiment of the present invention, reproduces representative moving-image thumbnails corresponding to one or more moving-image contents, and displays the reproduced representative moving-image thumbnails in response to an image reproduction request. The displayed representative moving-image thumbnails corresponding to the one or more moving-image contents may be as shown in FIG. 4 or 5.

Figure 4:
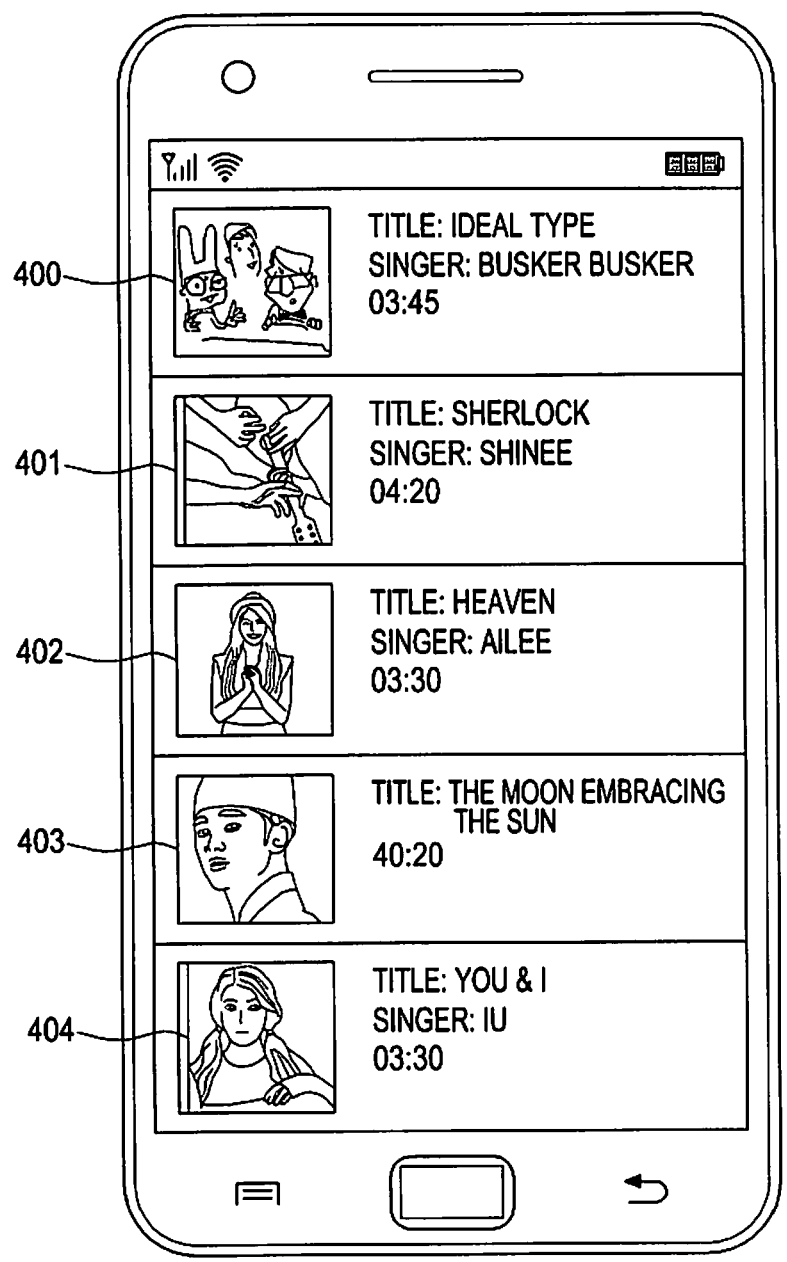
FIG. 4 is a diagram illustrating a screen on which representative moving-image thumbnails are reproduced and displayed in moving-image contents list display region, according to an embodiment of the present invention.

FIG. 4 is a diagram illustrating a screen on which representative moving-image thumbnails are reproduced and displayed in moving-image contents list display region, according to an embodiment of the present invention.

As shown in FIG. 4, the controller 10 may display image information, such as, for example, title, reproduction time, producer, and creator, of moving-image contents, as well as representative moving-image thumbnails 400, 401, 402, 403, and 404 corresponding to one or more reproduced moving-image contents.

Figure 5:
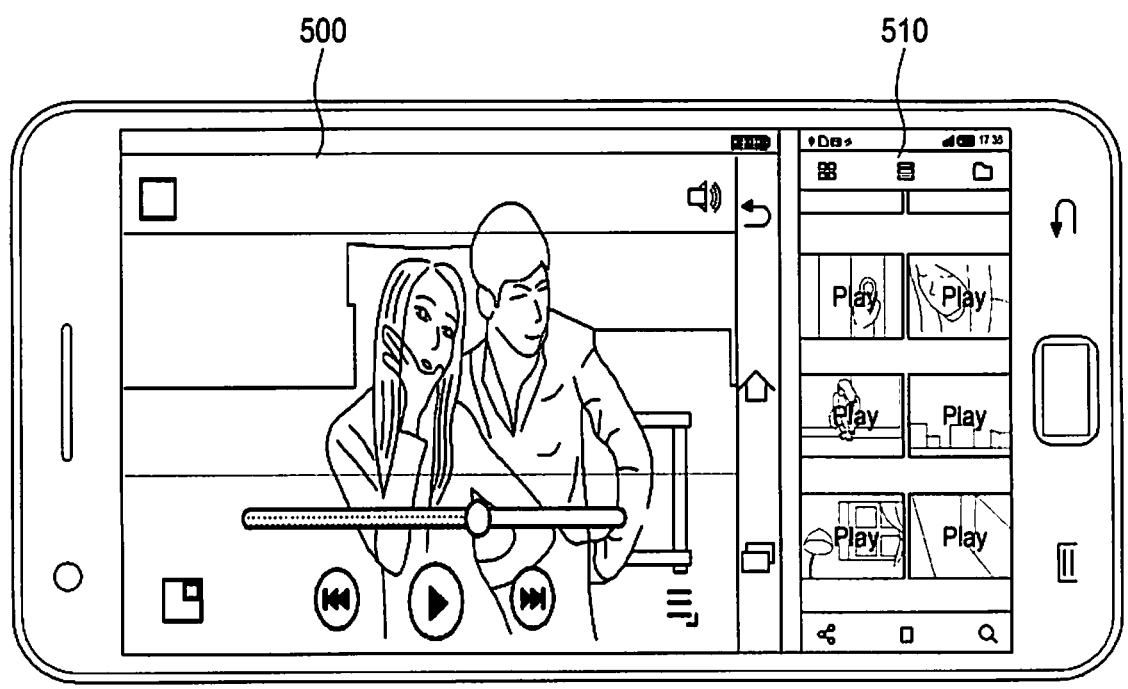
FIG. 5 is a diagram illustrating a display screen including a moving-image contents list display region together with an image reproduction region, according to an embodiment of the present invention.

FIG. 5 is a diagram illustrating a screen on which a moving-image contents list display region is displayed together with an image reproduction region, according to an embodiment of the present invention.

As shown in FIG. 5, the controller 10 may display the full region of the display unit 60, which is divided into a first region 500 for reproducing moving-image contents and a second region 510 for displaying representative video thumbnails corresponding to one or more moving-image contents.

Figure 6:
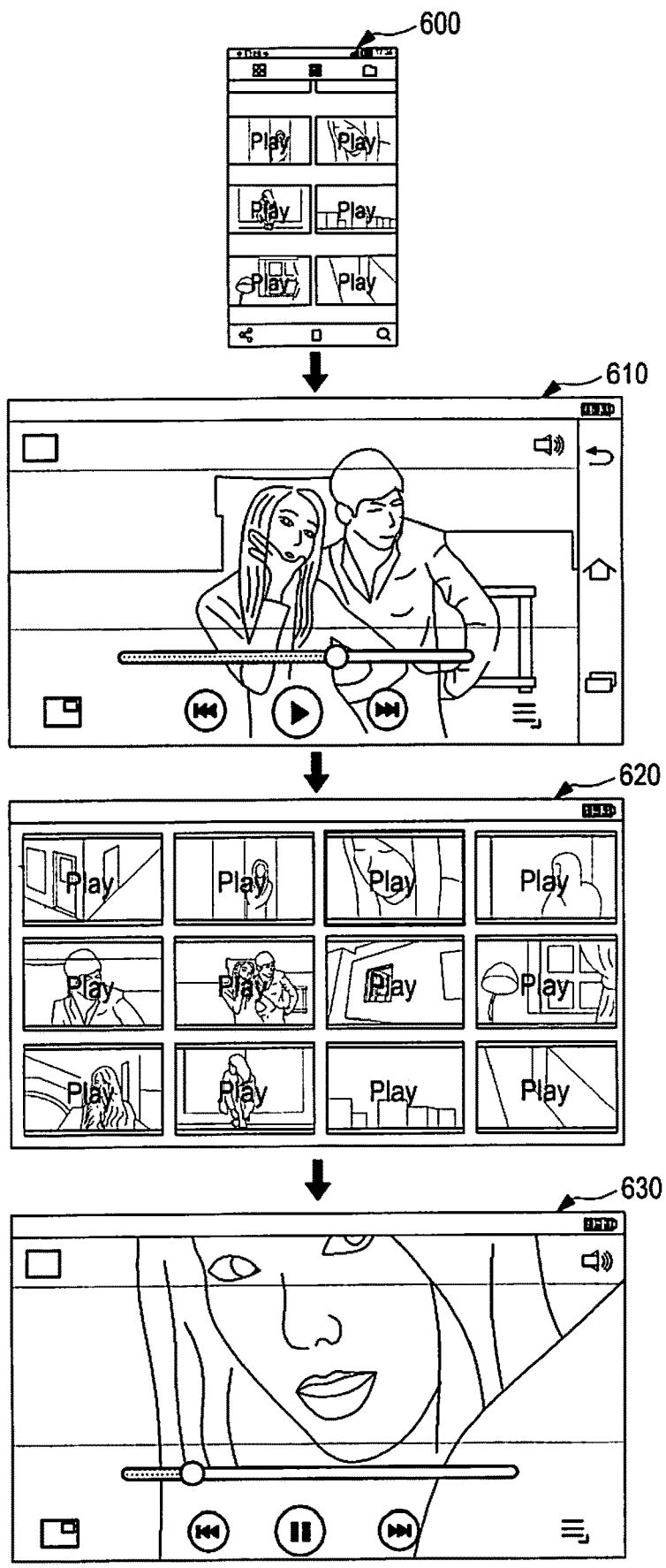
FIG. 6 is diagrams illustrating a process of reproducing an image by using a section-based moving-image thumbnail list, according to an embodiment of the present invention.

FIG. 6 is diagrams illustrating a process of reproducing an image by using a section-based moving-image thumbnail list, according to an embodiment of the present invention.

If an image reproduction request is input through the input unit 50, the controller 10 simultaneously reproduces and displays representative moving-image thumbnails corresponding to one or more moving-image contents, as shown on a screen 600. If one or more representative moving-image thumbnails have already been generated, the controller 10 may directly display the generated one or more representative moving-image thumbnails. If one or more representative moving-image thumbnails have not yet been generated, the controller 10 may generate representative moving-image thumbnails by converting one or more moving-image contents into a preset size. The controller may then sequentially display the generated representative moving-image thumbnails on the screen on a first-generated, first-displayed basis. The controller 10, when displaying one or more representative moving-image thumbnails through the display unit 60, configures and displays them as one list. For example, the controller 10 may configure and display a moving-image thumbnail list including one or more representative moving-image thumbnails as shown in the screen 600. The controller 10 may configure and display a moving-image thumbnail list, including image information regarding moving-image contents, as well as one or more representative moving-image thumbnails, as shown in FIG. 4.

If a selection of a representative moving-image thumbnail is input through the input unit 50 to reproduce particular moving-image contents, the controller 10 reproduces and displays moving-image contents corresponding to the selected representative moving-image thumbnail, as shown on a screen 610.

If a request for displaying one or more section-based moving-image thumbnails corresponding to the moving-image contents is input through the input unit 50, the controller 10 determines whether there are one or more section-based moving-image thumbnails. If there are one or more section-based moving-image thumbnails, the controller 10 simultaneously reproduces and displays the one or more section-based moving-image thumbnails on the screen, as shown on a screen 620. The controller 10 may configure a moving-image thumbnail list, including one or more section-based moving-image thumbnails, and display the moving-image thumbnail list on the screen. If one or more section-based moving-image thumbnails do not exist, the controller 10 divides moving-image contents into one or more moving-image sections according to a preset condition, and generates a video thumbnail by converting a portion of each video section. The controller 10 simultaneously reproduces and displays the one or more section-based moving-image thumbnails on the screen.

If a selection of a particular moving-image thumbnail from the reproduced one or more section-based moving-image thumbnails is input through the input unit 50, the controller 10 reproduces and displays moving-image contents of a moving-image section corresponding to the selected moving-image thumbnail, as shown on a screen 630. For example, if a video thumbnail corresponding to a moving-image section whose reproduction start time is 3 (minutes):20 (seconds) is selected, the controller 10 may start reproduction from a portion of moving-image contents corresponding to a reproduction start time of 3:20.

Figure 7:
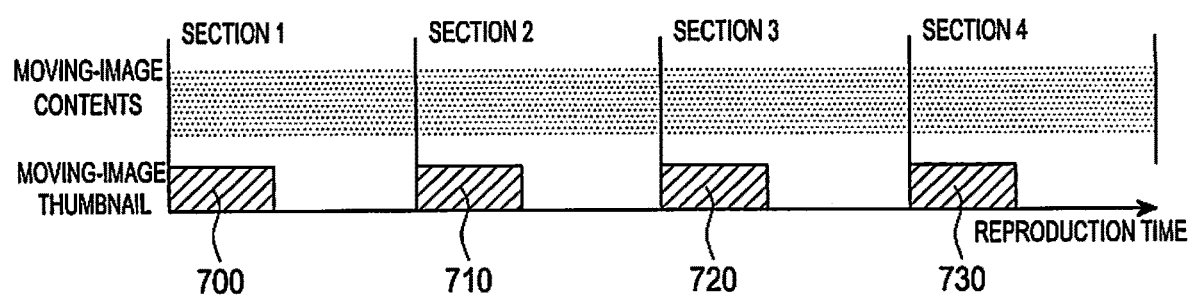
FIG. 7 is a diagram illustrating a process of generating a section-based moving-image thumbnail, according to an embodiment of the present invention.

FIG. 7 is a diagram illustrating a process of generating section-based moving-image thumbnails, according to an embodiment of the present invention.

If a request for displaying one or more section-based moving-image thumbnails is input through the input unit 50, the controller 10, according to an embodiment of the present invention, determines whether one or more section-based moving-image thumbnails exist. When one or more section-based moving-image thumbnails do not exist, the controller 10 divides moving-image contents into one or more moving-image sections according to a preset condition, and generates a moving-image thumbnail by converting a portion of each moving-image section. The preset condition may include feature information such as, for example, time, face detection, motion vector detection, facial expression detection, voice detection, and scene change.

For example, if the moving-image contents are divided into a total of four sections, that is, a first section, a second section, a third section, and a fourth section, according to a preset condition as shown in FIG. 7, the controller 10 generates a first moving-image thumbnail 700 corresponding to a first section by converting a portion of moving-image contents of the first section, which corresponds to a preset time in a reproduction time of the moving-image contents of the first section, into a preset size. In the same manner, the controller 10 generates a second moving-image thumbnail 710 corresponding to a second section, a third moving-image thumbnail 720 corresponding to a third section, and a fourth moving-image thumbnail 730 corresponding to a fourth section.

Thereafter, the controller 10 may generate a moving-image thumbnail list including the first moving-image thumbnail 700 corresponding to the first section, the second moving-image thumbnail 710 corresponding to the second section, the third moving-image thumbnail 720 corresponding to the third section, and the fourth moving-image thumbnail 730 corresponding to the fourth section and display the moving-image thumbnail list on the screen.

Thus, the user may immediately search for and view moving-image contents corresponding to a desired moving-image section.

Figure 8:
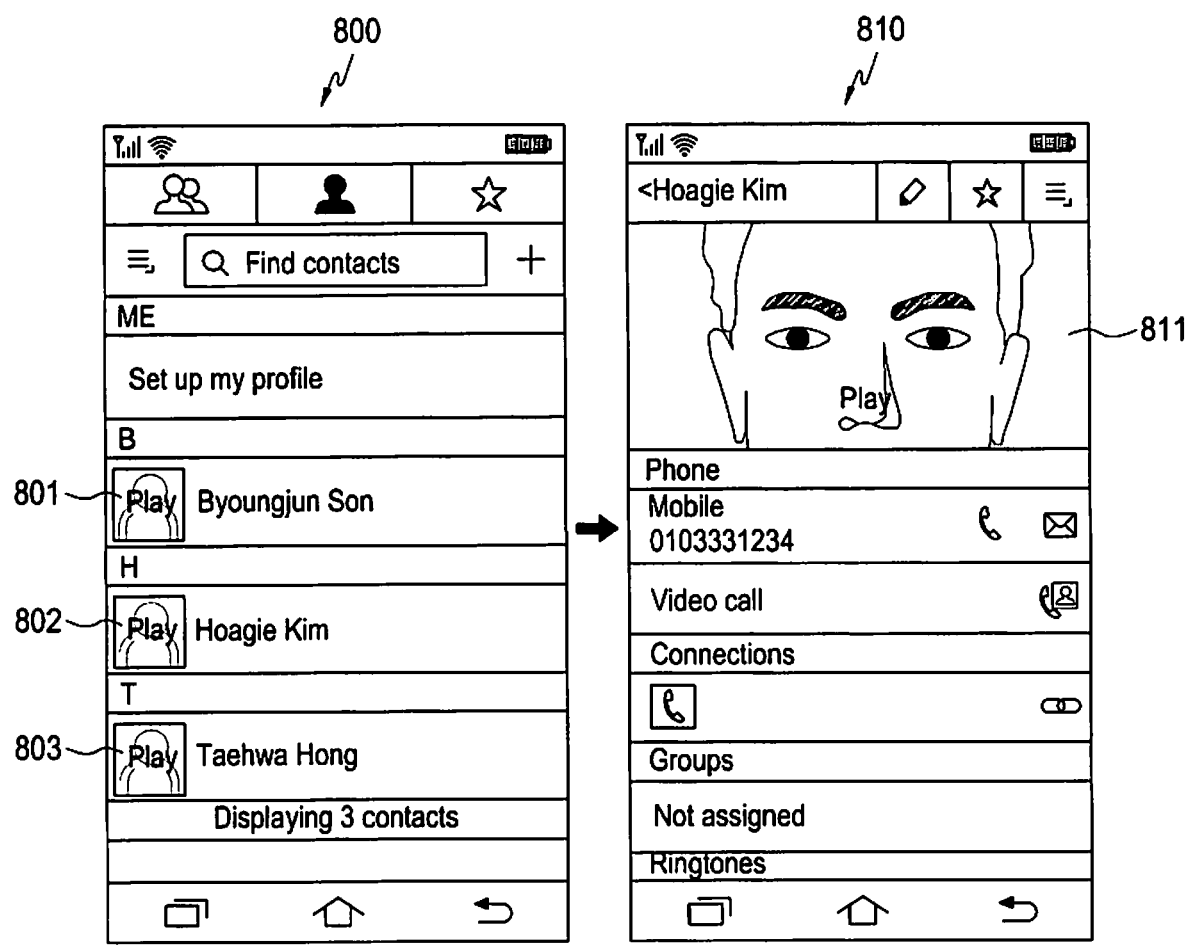
FIG. 8 is diagrams illustrating a process of reproducing and displaying moving-image thumbnails on a phonebook display region, according to an embodiment of the present invention.

FIG. 8 shows diagrams illustrating a process of reproducing and displaying a moving-image thumbnail on a phonebook, according to an embodiment of the present invention.

Embodiments of the present invention may be applied to a function or application, such as, for example, a phonebook, for which an image thumbnail may be displayed, as well as a function for reproducing moving-image contents.

For example, if the user desires to generate profile information, such as a phone number, of a particular person on the phonebook, embodiments of the present invention may provide a function for registering an image thumbnail or a moving-image thumbnail for the particular person. In this way, the user may register an image thumbnail or a moving-image thumbnail by capturing a still image or a moving image for the particular person or using a previously stored still image or moving image.

Thereafter, if a request for executing the phonebook is input through the input unit 50, as shown in FIG. 8, the controller 10 may simultaneously reproduce and display moving-image thumbnails 801, 802, and 803 corresponding to phone number items, together with a stored phonebook list, as shown on a screen 800.

If a selection for displaying detailed items, such as, for example, a name, a phone number, a home address, and an e-mail address, of a phone number item on the phonebook list is input through the input unit 50, the controller 10 may configure a detailed item screen corresponding to the selected phone number item and display the detailed item screen, as shown on a screen 810. The controller 10 may reproduce and display moving-image contents 811 corresponding to a moving-image thumbnail, which is previously stored corresponding to the phone number item, on the detailed item screen.

The embodiments of the present invention can be implemented with hardware, software, or a combination of hardware and software. Such arbitrary software may be stored, whether or not erasable or re-recordable, in a volatile or non-volatile storage such as a ROM; a memory such as a RAM, a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. The image reproduction method, according to embodiments of the present invention, may be implemented by a computer or a portable terminal that includes a controller and a memory. The memory is an example of a machine-readable storage medium that is suitable for storing a program or programs including instructions for implementing embodiments of the present invention. Therefore, embodiments of the present invention include a program including codes for implementing an apparatus or method claimed in an arbitrary claim and a machine-readable storage medium for storing such a program. The program may be electronically transferred through an arbitrary medium, such as a communication signal delivered through wired or wireless connection, and embodiments of the present invention properly include equivalents thereof.

The image reproduction apparatus may receive and store the program from a program providing device connected in a wired or wireless manner. The program providing device may include a memory for storing a program including instructions for instructing the image reproduction apparatus to execute a preset image reproduction method, information necessary for the image reproduction method, a communication unit for performing wired or wireless communication with the image reproduction apparatus, and a controller for transmitting a corresponding program to the image reproduction apparatus at the request of the image reproduction apparatus or automatically.

Embodiments of the present invention simultaneously reproduce and display representative moving-image thumbnails corresponding to one or more moving-image contents in response to a moving-image reproduction request, allowing the user to view the reproduced moving-image thumbnails and easily search for desired moving-image contents.

Moreover, since section-based moving-image thumbnails corresponding to moving-image contents are simultaneously reproduced and displayed, the user may view section-based moving-image thumbnails of particular moving-image contents and directly move to and view a desired moving-image section.

While the present invention has been shown and described with reference to certain embodiments thereof, it will be understood by those of skill in the art that various changes in form and detail may be made therein without departing from the scope of the present invention. Therefore, the scope of the present invention is not limited to the disclosed embodiments, and it should be defined by the scope of the following claims and equivalents thereof.

What is claimed is:

1. An electronic device for displaying video thumbnails, the electronic device comprising:
 a memory for storing instructions; and
 a processor configured to execute the instructions to at least:
  store a plurality of video contents including a first video content and a second video content in the memory,
  based on receiving a first user request, display a plurality of video thumbnails including a first video thumbnail and a second video thumbnail for the plurality of video contents on a display of the electronic device, wherein the plurality of video thumbnails are respectively generated from the plurality of video contents, and the first video thumbnail and the second video thumbnail respectively include a plurality of image frames to be sequentially displayed,
  based on a user input for selecting the first video thumbnail of the displayed plurality of video thumbnails, reproduce the first video content corresponding to the selected first video thumbnail,
  receive a user input for displaying a plurality of section-based video thumbnails corresponding to the first video content while reproducing the first video content,
  based on the plurality of section-based video thumbnails corresponding to the first video content not existing, divide the first video content into moving-image sections and generate the plurality of section-based video thumbnails corresponding to the moving-image sections by converting each of the moving-image sections into a moving-image content, wherein each of the plurality of section-based video thumbnails includes a plurality of image frames to be sequentially displayed, display the plurality of section-based video thumbnails corresponding to the first video content on the display, and based on a user input for selecting one of the displayed plurality of section-based video thumbnails corresponding to the first video content, reproduce a portion of the first video content corresponding to the selected section-based video thumbnail.

2. The electronic device of claim 1, wherein the processor is further configured to execute the instructions to perform at least one of:

simultaneously reproducing the plurality of video thumbnails while the plurality of video thumbnails are displayed on the display, and simultaneously reproducing the plurality of section-based video thumbnails while the plurality of section-based video thumbnails are displayed on the display.

3. The electronic device of claim 1, wherein each of the plurality of video thumbnails for the plurality of video contents has a size smaller than a size of a corresponding video content.

4. The electronic device of claim 1, wherein the first video content corresponding to the first video thumbnail is displayed on a first area of the display while the plurality of video thumbnails are displayed on a second area of the display.

5. The electronic device of claim 4, wherein the processor is further configured to execute the instructions to perform one of:

generating a video content list including the plurality of video thumbnails, dividing the second area into a plurality of regions, and displaying each of the plurality of video thumbnails on each of the plurality of regions.

6. The electronic device of claim 5, wherein the video content list further includes a title of a corresponding video content, a reproduction time of the corresponding video content, a producer of the corresponding video content, a creator of the corresponding video content, or a description of the corresponding video content.

7. The electronic device of claim 1, wherein different portions of the first video content are respective video sections into which the first video content is divided according to a preset condition, and wherein the preset condition comprises at least one of a motion detection, a face detection, a facial expression detection, a voice detection, and a scene change.

8. The electronic device of claim 7, wherein the processor is further configured to execute the instructions to perform:

generating the plurality of section-based video thumbnails by converting the different portions of the first video content into the plurality of section-based video thumbnails such that each of the plurality of section-based video thumbnails has a resolution or a file format selected by the user.

9. The electronic device of claim 1, wherein the plurality of video thumbnails are generated while the electronic device is in a sleep mode or is charging.

10. A method for displaying video thumbnails by an electronic device, the method comprising:

based on receiving a first user request, displaying a plurality of video thumbnails including a first video thumbnail and a second video thumbnail for a plurality of video contents including a first video content and a second video content on a display of the electronic device, wherein the plurality of video thumbnails are respectively generated from the plurality of video contents, and the first video thumbnail and the second video thumbnail respectively include a plurality of image frames to be sequentially displayed;

based on a user input for selecting the first video thumbnail of the displayed plurality of video thumbnails, reproducing the first video content corresponding to the selected first video thumbnail;

receiving a user input for displaying a plurality of section-based video thumbnails corresponding to the first video content while reproducing the first video content, based on the plurality of section-based video thumbnails corresponding to the first video content not existing, dividing the first video content into moving-image sections and generating the plurality of section-based video thumbnails corresponding to the moving-image sections by converting each of the moving-image sections into a moving-image content, wherein each of the plurality of section-based video thumbnails includes a plurality of image frames to be sequentially displayed, displaying the plurality of section-based video thumbnails corresponding to the first video content on the display; and based on a user input for selecting one of the displayed plurality of section-based video thumbnails corresponding to the first video content, reproducing a portion of the first video content corresponding to the selected section-based video thumbnail.

11. The method of claim 10, further comprising at least one of:

simultaneously reproducing the plurality of video thumbnails while the plurality of video thumbnails are displayed on the display; and simultaneously reproducing the plurality of section-based video thumbnails while the plurality of section-based video thumbnails are displayed on the display.

12. The method of claim 10, wherein each of the plurality of video thumbnails for the plurality of video contents has a size smaller than a size of a corresponding video content.

13. The method of claim 10, wherein the first video content corresponding to the first video thumbnail is displayed on a first area of the display while the plurality of video thumbnails are displayed on a second area of the display.

14. The method of claim 13, further comprising:

generating a video content list including the plurality of video thumbnails;

dividing the second area into a plurality of regions; and displaying each of the plurality of video thumbnails on each of the plurality of regions.

15. The method of claim 14, wherein the video content list further includes a title of a corresponding video content, a reproduction time of the corresponding video content, a producer of the corresponding video content, a creator of the corresponding video content, or a description of the corresponding video content.

16. The method of claim 10, wherein different portions of the first video content are respectively video sections into which the first video content is divided according to a preset condition, and the preset condition comprises at least one of a motion detection, a face detection, a facial expression detection, a voice detection, and a scene change.

17. The method of claim 16, further comprising:

generating the plurality of section-based video thumbnails by converting the different portions of the first video content into the plurality of section-based video thumbnails such that each of the plurality of section-based video thumbnails has a resolution or a file format selected by the user.

18. The method of claim 10, wherein the plurality of video thumbnails are generated while the electronic device is in a sleep mode or is charging.

19. A non-transitory computer readable storage medium with instructions stored thereon, the instructions executable by at least one processor of an electronic device to cause the at least one processor to control:

based on receiving a first user request, displaying a plurality of video thumbnails including a first video thumbnail and a second video thumbnail for a plurality of video contents including a first video content and a second video content on a display of the electronic device, wherein the plurality of video thumbnails are respectively generated from the plurality of video contents, and the first video thumbnail and the second video thumbnail respectively include a plurality of image frames to be sequentially displayed;

based on a user input for selecting the first video thumbnail of the displayed plurality of video thumbnails, reproducing the first video content corresponding to the selected first video thumbnail;

receiving a user input for displaying a plurality of section-based video thumbnails corresponding to the first video content while reproducing the first video content, based on the plurality of section-based video thumbnails corresponding to the first video content not existing, dividing the first video content into moving-image sections and generating the plurality of section-based video thumbnails corresponding to the moving-image sections by converting each of the moving-image sections into a moving-image content, wherein each of the plurality of section-based video thumbnails includes a plurality of image frames to be sequentially displayed, displaying the plurality of section-based video thumbnails corresponding to the first video content on the display; and based on a user input for selecting one of the displayed plurality of section-based video thumbnails corresponding to the first video content, reproducing a portion of the first video content corresponding to the selected section-based video thumbnail.

* * * * *